United States Patent
Serna Garcia-Conde et al.

(10) Patent No.: US 12,264,650 B2
(45) Date of Patent: Apr. 1, 2025

(54) METHOD FOR CONTROLLING AN OFFSHORE FLOATING TOWER WIND TURBINE, AND CONTROL SYSTEM AND WIND TURBINE THAT USE THE METHOD

(71) Applicant: ESTEYCO S.A., Madrid (ES)

(72) Inventors: Jose Salustiano Serna Garcia-Conde, Madrid (ES); David Sarrasin Gomez, Madrid (ES)

(73) Assignee: ESTEYCO S.A., Madrid (ES)

( * ) Notice: Subject to any disclaimer, the term of this patent is extended or adjusted under 35 U.S.C. 154(b) by 125 days.

(21) Appl. No.: 17/642,496

(22) PCT Filed: Sep. 15, 2020

(86) PCT No.: PCT/ES2020/070551
§ 371 (c)(1),
(2) Date: Mar. 11, 2022

(87) PCT Pub. No.: WO2021/053252
PCT Pub. Date: Mar. 25, 2021

(65) Prior Publication Data
US 2022/0325695 A1    Oct. 13, 2022

(30) Foreign Application Priority Data
Sep. 16, 2019    (ES) ................ ES201930802

(51) Int. Cl.
*F03D 7/02*    (2006.01)
*F03D 7/04*    (2006.01)
*F03D 13/25*   (2016.01)

(52) U.S. Cl.
CPC ............ *F03D 7/0224* (2013.01); *F03D 7/04* (2013.01); *F03D 13/25* (2016.05);
(Continued)

(58) Field of Classification Search
CPC ........ F03D 7/02; F03D 7/0202; F03D 7/0224; F03D 7/0298; F03D 7/0302; F03D 7/04;
(Continued)

(56) References Cited

U.S. PATENT DOCUMENTS 8,186,949 B2 *   5/2012  Nielsen ................ F03D 7/0296
                                                                     416/37
10,024,303 B2 *  7/2018  Wakasa ................... F03D 7/026
(Continued)

FOREIGN PATENT DOCUMENTS

CN    103541861 A *  1/2014
EP    2063110 A1     5/2009
(Continued)

*Primary Examiner* — Brian P Wolcott
(74) *Attorney, Agent, or Firm* — Hayes Soloway P.C.

(57) ABSTRACT

The invention relates to a control method for controlling an offshore floating tower wind turbine and to various systems and a wind turbine that use said method. The invention is mainly based on the control of the pitch angle of the blades of the wind turbine by means of power levels different from rated power, depending on the movement conditions to which the wind turbine is subjected at sea, and for above rated operating conditions wind speed. Owing to the described method, the invention allows the movements experienced by the wind turbine to be reduced, using the energy performance thereof more efficiently, without detriment to the service life thereof.

14 Claims, 9 Drawing Sheets

(52) U.S. Cl.
CPC ....... *F05B 2240/93* (2013.01); *F05B 2240/95* (2013.01); *F05B 2270/1033* (2013.01); *F05B 2270/32* (2013.01)

(58) Field of Classification Search
CPC .... F03D 13/25; F03D 13/256; F05B 2240/93; F05B 2240/95; F05B 2260/96; F05B 2270/1033; F05B 2270/32; F05B 2270/326–328
See application file for complete search history.

(56) References Cited

U.S. PATENT DOCUMENTS

| | | | |
|---|---|---|---|
| 10,890,159 B2 * | 1/2021 | Caponetti | ............... F03D 7/043 |
| 2006/0003333 A1 | 2/2006 | Wilson et al. | |

FOREIGN PATENT DOCUMENTS

| | | | | |
|---|---|---|---|---|
| EP | 2924280 A1 | | 9/2015 | |
| EP | 3004636 A1 | | 4/2016 | |
| EP | 1719910 B1 | | 6/2019 | |
| GB | 2466649 A | | 7/2010 | |
| GB | 2602301 A | * | 6/2022 | ............ F03D 13/25 |
| WO | 2014191001 A1 | | 12/2014 | |

* cited by examiner

METHOD FOR CONTROLLING AN OFFSHORE FLOATING TOWER WIND TURBINE, AND CONTROL SYSTEM AND WIND TURBINE THAT USE THE METHOD

CROSS-REFERENCE TO RELATED APPLICATIONS AND PRIORITY

This patent application claims priority from PCT Patent Application No. PCT/ES2020/070551 filed Sep. 15, 2020 which claims priority from Spanish Patent Application No. P201930802 filed Sep. 16, 2019. Each of these patent applications are herein incorporated by reference in their entirety.

FIELD OF THE INVENTION

The present invention is comprised in the field of marine wind energy generation technologies. Specifically, the invention relates to a control method for controlling offshore floating tower wind turbines. The invention likewise relates to a system and wind turbine that use or implement said method.

BACKGROUND OF THE INVENTION

The worldwide development potential of offshore wind energy is promising. The major improvement in the efficiency of this technology will make its role in the future worldwide energy "mix" to be very relevant.

Compared to an onshore wind turbine facility, offshore facilities pose greater technological as well as access difficulties, but it has three tremendous advantages: on one hand, the large wind resource found at sea with respect to on land, and on the other hand, the abundance of available space for installing wind turbines without any appreciable social impacts. Lastly, the fact that these spaces are very close to major centers of electrical consumption because most of the population inhabiting the plant can be found in areas near the coast, is also relevant.

Marine wind energy generation technologies, in turn, can be distinguished into two large groups: wind turbines installed on fixed structures anchored or supported on the seabed, also referred to as bottom-fixed structures, and wind turbines installed in floating structures.

The behavior of a wind turbine on a bottom-fixed structure is, logically, similar to that of an onshore turbine. This technology has very quickly advanced towards cost improvement and, right now, it is being used in significant volumes in Europe and other parts of the world, with promising energy costs. The latest contracts awarded in adjudications in Europe were for less than 50 €/MWh for the energy produced.

The case of the offshore wind, however, is different. This technology is still not commercially available, and there are only a handful of prototype and pre-serial facilities worldwide. One of the most important technological aspects to be resolved in this field is control of the turbine on a structure that moves, unlike what occurs in onshore wind energy or offshore bottom-fixed wind energy, in which wind turbines operate on fixed structures. The float thereby induces movements in the turbine and the turbine induces movements in the float. Efficiently controlling this movement is a technological challenge, and this is the field where in which the present invention is applied.

One of the main challenges facing the industry in this regard is the phenomenon known as negative damping.

Aerodynamic damping is a very relevant and beneficial aspect for reducing movements and/or stresses on wind turbines and the structures that support them. Very briefly, aerodynamic damping is based on aerodynamic force variations resulting from the movement of the wind turbine tending to resist and/or slow down a said movement: when the wind turbine is displaced against the wind, relative wind speed on the rotor increases. The thrust of the wind resisting movement thereby grows, thus contributing to slowing down said movement. Likewise, when the wind turbine is displaced in the opposite direction, in the same direction as the wind, the relative wind speed on the rotor drops, and the thrust of the wind going in the direction of the movement decreases, which contributes to reducing or damping said movement. This is a positive damping phenomenon.

However, in modern wind turbines in which the blade pitch angle "A" is regulated (see FIGS. 1A-1B), when a certain wind speed, referred to as rated wind speed (Vr), is exceeded, the control system acts on the blade pitch angle "A" (see FIG. 2B) to prevent the power from exceeding the rated power of the wind turbine (see FIG. 2A) and moderate the maximum stresses to be withstood by the machinery and the structure. As a consequence of said form of control, which is used in virtually all modern multimegawatt wind turbines on fixed structures, for wind speeds greater than Vr (a situation commonly known as above rated operation), the relationship between wind speed and thrust on the wind turbine is inverted, as can be observed in FIG. 2C, for the purpose of keeping the power approximately constant and equal to the rated power of the wind turbine. Therefore, with a conventional controller in the above rated operation, an increase in the wind speed does not produce an increase in thrust on the rotor, but rather it produces a decrease, and a decrease in wind speed does not entail a decrease in thrust on the rotor, but rather an increase. For above rated operation situations, this leads to the positive damping effect described above being able to be inverted, giving rise to the negative damping phenomenon, which may involve an undesirable increase in movements and stresses experienced by the wind turbine and its components. In simple terms, the reason behind said negative damping phenomenon is that when the turbine moves towards the wind, it generates an apparent or relative "additional wind". Since the turbine is already operating at full power, or above rated, the controller increases the pitch angle "A" for the purpose of keeping the power constant, which entails a decrease in thrust of the wind on the blades and the rotor together. The side effect of that is that this thrust on the blades, which helped to slow down the forward movement of the turbine, is reduced. In contrast, when the turbine stops moving forward and starts moving backwards, apparent wind drops, and as a result of said lower wind, the controller of the turbine reduces the blade pitch angle "A" so that said blades generate more thrust and torque on the rotor in order to maintain power despite said lower apparent wind. By generating more thrust, they accentuate rearward movement of the turbine.

The harmful effect of this phenomenon is greater the more movement the wind turbine experiences, and it is therefore particularly critical in the design and operation of floating wind turbines. Therefore, this behavior of the conventional control, which maximizes production and minimizes loads on fixed wind turbines fixed, generates undesired and often times unacceptable movements in the offshore floating turbines.

Resolving the movements generated in offshore floating turbines caused by changes in the wind, by the waves, and by negative damping induced by the very operation of the turbine has been the object of various solutions known in the state of the art.

The basic premise in most of these solutions is to add to the control data of the turbine the datum corresponding to the position or speed of the turbine through the movement of the tower in order to try to introduce a form of correction in the datum relating to the blade pitch angle.

Therefore, for example, patent application US 2006/0033338 A1 describes a turbine control system comprising a wind flow estimator, which provides wind flow, position of the tower, and speed of the tower to calculate the desired pitch angle.

Patent EP 2063110 B1 describes a turbine control system comprising a control system using tower inclination information to modify the reference turbine rotation speed of the wind turbine and achieve a stabilizing effect in the floating system.

Patent application EP 1719910 A1 describes a control system for turbines using an accelerometer in the turbine to detect vibration in the tower of a turbine and, therefore, modify the pitch angle to prevent the tower vibration mode.

Patent EP 3004636 B1 describes a system for damping the tilt of a floating turbine by acting on the pitch and rotation speed of the rotor based on turbine acceleration information.

Patent EP 2924280 B1 describes a control system for floating turbines acting on pitch depending on the movement of the turbine in the stop phase, start phase, and when the turbine is not producing energy in order to stabilize it.

Nonetheless, the above known solutions for mitigating the harmful effects of negative damping Io reduce but generally do not eliminate said damping. Furthermore, they have the added problem that they allow said decrease or mitigation of the negative damping at the expense of a loss of energy, compared to the performance that would be offered by a wind turbine on a fixed structure. Basically, what they do is capture less wind, such that they leave margin for the blades to abandon or at least depart to a certain extent from that behavior described for the control of onshore turbines which generates negative damping.

In light of the above technical problems and limitations, it is necessary to provide new control methods for controlling floating wind turbines that allow the unfavorable effect of negative damping to be reduced to a greater extent. The present invention allows said need to be met as a result of a novel control method for controlling the floating wind turbines, which not only may improve the decrease in the negative damping effect, but can also eliminate it or generate a certain positive damping effect, even in above rated operation situations, all while minimizing the loss of energy with respect to loss of energy that would be experienced by a fixed structure, or even providing a certain increase in the production of energy.

BRIEF DESCRIPTION OF THE INVENTION

To overcome the drawbacks of the state of the art described above, the object of the present invention is to provide a novel control method for controlling wind turbines, devised to minimize, eliminate, or even invert the undesirable negative damping effects for wind turbine operation with wind speeds greater than the rated speed "Vr" (above rated operation), thus reducing loads in the wind turbine and in the support structure, and with low or zero loss in the energy production capacity.

To better describe the invention, specific definitions, and explanations of certain terms, interpreted in the scope of the present invention and its preferred embodiments, are provided below:

Rated power of a wind turbine ($P_{rated}$): The rated power of the wind turbine is a value forming part of the technical characteristics of a certain wind turbine model, and it is naturally one of the key parameters in marketing wind turbines and is therefore reflected in virtually all documents containing the technical and/or marketing characteristics of modern wind turbines. Often, though not always, the rated power of a wind turbine even forms part of the name used to refer to a specific model. Thus, for example, the rated power of the AW3000 wind turbine from the manufacturer Acciona Windpower is 3000 kw, the rated power of the SWT-3.6-107 model from the manufacturer SIEMENS is 3.6 MW, and the rated power of the 2.75-120 model from the manufacturer GE has a rated power of 2.75 MW, to name a few examples. In general, the rated power coincides with the maximum power at which a wind turbine operates in suitable wind conditions. With conventional control systems, the rated power is generally the upper power threshold after which the control system starts to apply increases in blade pitch angle "A" to generally keep the power of the wind turbine below or from surpassing said threshold. This does not mean that rated power is the real or design limit capacity of the wind turbine, nor does it prevent wind turbines from working in certain cases at power levels greater than the rated power under certain specific and/or temporary conditions. For example, if a very rapid increase in the speed of the wind turbine is produced, this may lead to a temporary increase in power because the response time of the controller in adjusting blade pitch angle, reducing power, is not instantaneous. Or, for example, the singular point of transition between the below rated operation and above rated operation may involve momentary situations of power slightly greater than rated power. In any case, the conventional control methods are designed to try to keep the wind turbine working at a power that is not greater than the rated power.

Blade pitch angle (A): Blade pitch angle "A" refers to the position or rotation of the blade according to an axis coinciding substantially with the longitudinal axis thereof, as schematically seen in FIGS. 1A-1B. It is common to use wind turbines capable of varying the pitch angle of the blades in the state of the art, which is a process generally controlled by a control system or controller, which carries out said function based on a series of control algorithms.

There is a certain pitch angle of the blades that maximizes their aerodynamic exposure to the incident wind, and with it the energy production capacity and the horizontal thrust exerted by the wind. By convention, said position is usually defined as the minimum pitch angle "A" position of the blade, assigning to said position a value A=0 degrees. As the blade rotates, its exposure to incident wind drops, and the torque generated by the wind on the rotor, the produced power, and/or the horizontal thrust that the wind exerts on the rotor also drop, in what is often and by convention referred to as a rotation that increases the pitch angle "A" of the blade. When said angle "A" reaches its maximum value, which is equal or close to 90 degrees, the blades are in the position which minimizes or eliminates the torque and thrust generated by the wind, a position usually known as "feathered blades" (see FIG. 1B). This is the convention of values and signs of the pitch angle "A" of the blade commonly used in the wind turbine industry, and it will also be used for the description of the present invention, where it is of course possible to use other possible conventions of values or signs without departing from the scope of the invention.

The pitch angle "A" of the blade with is used in each instant is established by the control system for controlling the wind turbine and depends, among other factors, on the speed of the incident wind, although control systems usually take the rotation speed of the rotor and/or of the generator, which in turn depend on the speed of the incident wind and are more simply and more reliably monitored, as a control parameter.

Wind speed (Vw): This is the speed at which the wind strikes the rotor of a wind turbine. Obviously said speed is generally not the same at all points of the plane of the rotor, so the value assigned to Vw is a mean and/or representative value.

It is appropriate and relevant to distinguish between absolute wind speed, measured with respect to a fixed point in space, and apparent or relative wind speed with respect to the rotor. When the wind turbine is still or fixed, both speeds are equal, but when the wind turbine experiments movements, the absolute wind speed is different from the relative speed at which the wind strikes the rotor (see FIGS. 4A-4B). Therefore, when the wind turbine moves against the wind, the apparent or relative speed grows and is greater than the absolute wind speed, whereas when the wind turbine moves in the same direction as the wind, the relative wind speed decreases and is less than the absolute speed. Throughout the description of the present invention, unless otherwise indicated, wind speed Vw refers to the apparent or relative speed with respect to the rotor.

Speed of the wind turbine (Va): A wind turbine may experiment movements particularly as a consequence of the displacements or deformations of the substructure that supports it. As a convention to be used throughout the description of the present invention, when the wind turbine moves in a direction contrary to the direction of the wind, its speed is understood as being positive (Va>0) (see FIG. 3A), and when it moves in the same direction as the wind, its speed is negative (Va<0) (see FIG. 3B). Obviously, if the wind turbine is perfectly still, then Va=0.

Naturally, the movement of the wind turbine will be cyclical, such that cycles with Va>0, hereinafter referred to as "forward movement cycles", will be intercalated with cycles with Va<0, hereinafter referred to as "backward movement cycles" or backward movements.

The movement and speed of the wind turbine will generally not perfectly coincide with the direction of the wind, nor will it be perfectly perpendicular to the plane of the rotor. Throughout the description of the present invention, Va is referred to as the overall speed component of the wind turbine projected onto the shaft of the rotor. Therefore, Va can be determined from speed vector decomposition, providing the corresponding vector component of speed according to said shaft of the rotor.

Note that the above criterion or convention for the definition of Va equally applies to upwind wind turbines (with the rotor located upwind) or downwind wind turbines (with the rotor located downwind). Naturally, other conventions regarding the direction of movement and/or the sign of Va are possible without departing from the scope of the invention.

After having established certain definitions, the description of the invention shall now continue. The underlying premise or criterion of control systems known in the art is that when the turbine is in above rated operation mode, there is a restriction consisting of the generated power not being above the rated power $P_{rated}$ of the wind turbine. Therefore, conventional controllers are designed and programmed to try to prevent and/or correct the power exceeding said threshold $P_{rated}$.

In this context, the present invention uses a control method for controlling the turbine which uses adjustments to power, with intentional variations that may be situated both above and below $P_{rated}$, to prevent or mitigate negative damping during above rated operation. Said variation in power is applied by means of a specific method devised so that the negative damping phenomenon can be prevented or reduced. Furthermore, even though the power may intentionally exceed the rated power $P_{rated}$ for brief time periods, the method allows the average power to be kept substantially similar to the rated power, such that the demand, stresses and/or requirements on the generator and the electrical system are similar to those that would be present in a situation of power approximately constant and equal to the rated power $P_{rated}$.

To that end, in the forward movements of the wind turbine or forward movement cycles (Va>0), in which the wind Vw that the turbine "sees" (apparent wind) tends to increase, the control method according to the present invention causes the turbine to increase power and produce above its rated power; in contrast, when the turbine moves backwards (backward movement cycle with Va<0), the control method causes the turbine to lower its power and produce below said rated power.

As a result of said intentional and specific adjustment to the working power, it is possible to adopt values of the pitch angle A of the blades which reduce or eliminate the negative damping effect.

Control of negative damping with specific criteria for the variation of production power, according to the invention, presents considerable advantages over the current state of the art:

Not only is negative damping decreased, but positive and/or active damping can also be generated during above rated operation: current systems decrease negative damping produced by typical onshore turbine control. These systems do not eliminate negative damping, but rather only lessen it. The turbine continues moving more than what it should due to the characteristics of the float, the waves, and the variable thrust of the wind. With the control system through the power, negative damping may disappear altogether and become positive damping, a positive damping. As a result, the turbine radically decreases its movements, with the corresponding decrease in loads in the different elements of the turbine, the float, and the float mooring, which may improve the safety and/or economics of the wind turbine as a whole. With a control system according to the present invention, the inevitable movements of a floating wind turbine lead to variations in power being applied during above rated operation, but said variations contribute to reducing the movements, and by reducing the movements, the variations in the power that need to be applied are in turn smaller, with a virtuous circle of decreasing movements and with it decreasing the necessary variations in power being generated.

It provides an increase in energy produced over the energy losses in current negative damping mitigation systems: current systems are based on letting some wind pass to prevent the negative damping that would be produced by the typical control software of onshore turbines when the turbines are working with intense winds close to the turbine rated power. Therefore, to a certain extent less energy is produced than what would be produced with the same wind turbine located on a fixed structure. The proposed control method based on specific provoked variations in power, in contrast, combines moments in which wind is left to pass in backward movement cycles, with moments in which more wind is captured in forward movement cycles, such that when forward movement takes place, the turbine produces more, and when backward movement takes place, the turbine produces less. Therefore, the overall energy production does not drop, and it may even be increased. In fact, since production is proportional to the cube of wind speed, production gains when the turbine moves forward may be greater than the production losses when the turbine moves backward.

The control system has a simplified programming possibility: The control system may be programmed in diverse ways, considering different available inputs. An example of a possible simple programming will be to use a logic similar to the current control logic for above rated situations in onshore or bottom-fixed turbines, in which a logic is introduced which modifies the parameter of power to be produced with an input on the induced speed and/or acceleration of the turbine/tower caused by the forward and backward movement of the float, such that it upwardly modifies the maximum power and/or target power in moments in which the turbine moves forward and decreases it in the situations in which it moves backward. This power modification algorithm may take a number of variables into account, including among them the temporary difference between the incidence of apparent wind and the modification of rotor speed, which is not instantaneous due to the rotational inertia of the rotor and/or bending of the blades.

Therefore, if there is a change in the real wind speed, without backward movement of the turbine, the control system will continue to act normally and will increase the pitch angle similarly to how a conventional controller known in the art does. However, if a speed Va of the wind turbine is above a certain threshold, the control system will modify the parameter of maximum power and/or target power to be produced, upwardly and/or downwardly selectively depending on Va, for suitably damping those movements of the wind turbine.

The variation or intentional power adjustment according to the method of the invention may be carried out, for example, by varying the rotation speed of the rotor, or by varying the torque of the generator, or by means of a combination of both. In a preferred embodiment of the method according to the invention, the variation in power is applied by means of a variation in the torque of the generator, whereas the speed of the rotor that the control system seeks or tries to maintain is constant. Said constant rotation speed that is sought is preferably the rated rotation speed, which is the rotation speed at which the rotor would rotate at a rated potential if the wind turbine were operating on a fixed structure and using its standard or conventional controller. In said embodiment, when applying the variation in power according to the method of the invention, keeping an approximately constant rotation speed of the rotor, the algorithms for adjusting the pitch angle A can be similar to those used in conventional control algorithms, which generally operate by keeping an approximately constant rotation speed of the rotor.

In another possible embodiment, additional data can be captured such as the wind real measured in front of the turbine, in addition to the relative movement of the turbine induced by the movement thereof to program the control method according to the present invention.

Therefore, the object of the invention is preferably performed by means of a control method for controlling an offshore floating tower wind turbine, wherein said wind turbine:
- comprises a rotor with a plurality of blades;
- produces a power P that is variable over time and dependent on the speed $V_w$ at which the wind strikes the rotor, where $P_{rated}$ is the rated power of the wind turbine that may be achieved when $V_w$ is equal to or greater than the rated wind speed $V_r$;
- comprises regulating means for regulating the pitch angle A of the blades, such that:
  - given a certain wind speed $V_w$, an increase in the pitch angle A of the blade entails a decrease in the rotation speed of the rotor and/or of the produced power P and/or of the thrust that the wind exerts on the rotor;
  - given a wind speed $V_w$, a decrease in the pitch angle A of the blade entails an increase in the rotation speed of the rotor and/or of the produced power P and/or of the thrust that the wind exerts on the rotor;
  - the pitch angle A of the blades has a minimum value which is assigned, by convention, the 0-degree pitch value for the blade;
  - given a wind speed $V_w$ greater than $V_r$, there is a theoretical pitch angle of the blades At greater than 0 degrees, such that the produced power P is substantially equal to $P_{rated}$;
- experiments, in at least one working condition, movements that generate a speed $V_a$ of the wind turbine, which is understood as being positive ($V_a>0$) when the wind turbine is displaced in a direction substantially contrary to the direction of the wind, and is understood as being negative ($V_a<0$) when the wind turbine is displaced in a direction coinciding substantially with the direction of the wind;
- comprises sensors allowing the speed of the wind turbine $V_a$ to be monitored directly or indirectly.

Said control method advantageously further comprises performing the following steps:
- at least during part of the time for which the speed of the wind turbine Va is positive ($V_a>0$) and the wind speed $V_w$ is greater than $V_r$ ($V_w>V_r$), a pitch angle A of the blades less than $A^t$ ($A<A_t$) is established, and the generator produces a power P greater than $P_{rated}$ ($P>P_{rated}$); and/or
- at least and only during part of the time for which the speed of the wind turbine $V_a$ is negative ($V_a<0$) and the wind speed $V_w$ is greater than $V_r$ ($V_w>V_r$), a pitch angle A of the blades greater than $A_t$ ($A>A_t$) is established, and the generator produces a power P less than $P_{rated}$ ($P<P_{rated}$).

The manner in which the control system establishes the pitch angle A may consist of applying a specific value or of applying variations in A until reaching a specific target situation (for example a specific rotation speed of the rotor), or by means of any other method or algorithm known in the art.

In a preferred embodiment of the method of the invention, a pitch angle A of the blades less than $A_t$ ($A<A_t$) is established, and the generator produces a power P greater than $P_{rated}$ ($P>P_{rated}$) only when $V_a>0$. In a preferred embodiment of the method of the invention, power during the forward movement cycles exceeds the rated power $P_{rated}$ by more than 5%. And more preferably, power during the forward movement cycles exceeds the rated power $P_{rated}$ by more than 15%.

In a preferred embodiment of the method of the invention, a variable $P_{max}$ is additionally used, where:
- the value of $P_{max}$ is established dynamically and may therefore vary in each instant;
- $P_{max}$ is defined as the upper power threshold P admitted by the control method, such that if the wind speed and/or the speed of the rotor increase, tending to generate a power greater than $P_{max}$, action is taken by increasing the pitch angle A of the blades so as to prevent and/or correct the power in the generator being greater than $P_{max}$;

and where:
- at least during part of the time for which the speed of the wind turbine is positive, variable $P_{max}$ is assigned a value greater than $P_{rated}$; and/or
- at least and only during part of the time for which the speed of the wind turbine is negative, variable $P_{max}$ is assigned a value equal to $P_{rated}$.

In another preferred embodiment of the method of the invention, a variable $P_{min}$ is used, where:
- the value of $P_{min}$ is established dynamically and may therefore vary in each instant;
- $P_{min}$ is defined as the lower power threshold after which the control system acts to reduce the pitch angle A of the blades, such that if A>0 and the wind speed and/or the speed of the rotor decrease, tending to generate a power less than $P_{min}$, action is taken by reducing the pitch of the blades so as to maintain and/or increase the power in the generator;

and where:
- at least and only during part of the time for which the speed of the wind turbine is positive, variable $P_{min}$ is assigned a value equal to $P_{rated}$; and/or
- at least and only during part of the time for which the speed of the wind turbine is negative, variable $P_{min}$ is assigned a value less than $P_{rated}$.

In another preferred embodiment of the method of the invention, a variable $P_{target}$ is used, where:
- the value of $P_{target}$ is established dynamically and may therefore vary in each instant;
- $P_{target}$ is defined as the target power that the control system seeks to generate in a specific instant;
- the value of the variable $P_{target}$ is established depending at least on the value of $V_a$ and where:
- at least during part of the time for which the speed of the wind turbine is positive, variable $P_{target}$ is assigned a value greater than $P_{rated}$; and/or
- at least and only during part of the time for which the speed of the wind turbine is negative, variable $P_{target}$ is assigned a value less than $P_{rated}$.

The value of variable $P_{target}$ may further be determined depending on the value of $V_w$ and/or the value of the rotation speed of the rotor. The value of variable $P_{target}$ may further be determined depending on the value of the inclination and/or acceleration of the wind turbine, which may allow anticipating the value of $V_a$ in future instants, such that the control method can be anticipated at the expected value of $V_a$.

In one embodiment of the method of the invention, $P_{target}=P_{rated}$ is established while the absolute value of the speed of the wind turbine Va is kept below a certain threshold $V_{a,lim}$. Therefore, for reduced movements, the control method can thereby be kept similar to the method used in a standard manner on fixed structures, and when movements grow and the speed of the wind turbine, in absolute value, exceeds said threshold $V_{a,lim}$, the method according to the present invention for better damping said movements is used.

In another preferred embodiment of the method of the invention, the value of the pitch angle A of the blades is established taking into consideration the value and/or sign of the speed $V_a$ of the wind turbine.

In another preferred embodiment of the method of the invention, the value of the pitch angle A of the blades is defined in two phases:
- a first phase in which the value of theoretical pitch angle $A_t$ is calculated with rules identical or similar to the used in the standard control system of said wind turbine when operating on a fixed substructure;
- a second phase in which a correction is applied on said theoretical pitch value of the blade to establish the real pitch value to be applied, establishing said correction according to at least one of the following rules:
  - if the speed of the wind turbine is positive, a correction is applied on the theoretical pitch value which prevents, reduces, or delays increases in pitch;
  - if the speed of the wind turbine is negative, a correction is applied on the theoretical pitch value which prevents, reduces, or delays decreases in pitch.

In another preferred embodiment of the method of the invention:
- at least during part of the time for which the speed of the wind turbine is positive ($V_a$>0) and $V_w$>$V_r$, said control system does not admit increases in the pitch angle A of the blades; and/or
- at least during part of the time for which the speed of the wind turbine is negative ($V_a$<0) and $V_w$>$V_r$, said control system does not admit decreases in the pitch angle A of the blades.

In another preferred embodiment of the control method of the invention, said control is exerted only in the event of movements of the wind turbine having a specific amplitude and/or speed threshold value.

In another preferred embodiment of the method of the invention, said method comprises monitoring the temperature in the wind turbine by means of sensors, and wherein the value which variables $P_{max}$ and/or $P_{target}$ are assigned in each instant depends on the temperature measured in the generator.

In another preferred embodiment of the method of the invention, said method comprises monitoring the voltage in the wind turbine by means of sensors, and wherein the value which variables $P_{max}$ and/or $P_{target}$ are assigned in each instant depends on the voltage measured in the generator.

In another preferred embodiment of the method of the invention, said method is used in a wind turbine supported by a highly flexible and non-floating substructure, the first oscillation mode of which has a period equal to or greater than 3 seconds.

A second object of the invention relates to a computer program implementing instructions for executing a method according to any of the embodiments described herein.

A third object of the invention relates to a control system for controlling a wind turbine (1), characterized in that it comprises one or more monitoring sensors for monitoring the physical parameters of said wind turbine and software/hardware means configured for carrying out a method according to any of the embodiments described herein.

A fourth object of the invention relates to a wind turbine using a control method or a control system according to any of the embodiments described herein.

In a preferred embodiment of the invention, the wind turbine comprises a generator and/or an electrical system capable of temporarily producing a power P greater than it rated power $P_{rated}$, in intermittent periods having a duration of less than 100 seconds and intercalated with periods in which a power P less than $P_{rated}$ is produced. The duration and frequency of said over-production periods ($P>P_{rated}$) will be similar to those of the phases in which the wind turbine moves with positive speed ($V_a>0$). A standard wind turbine standard may generally meet this condition, particularly as a result of the over-production periods being intercalated with under-production periods, as is made possible by the method of the invention.

The preceding embodiments must not be understood as being limiting of the scope of protection of the invention, with said scope comprising any technically possible combination thereof, provided that they are not mutually exclusive.

The expression "substantially", applied to any of the terms used herein, shall be understood to be identical or comprised in a 20% margin of variation, above or below.

DESCRIPTION OF THE DRAWINGS

The preceding and other features and advantages will become more apparent from the detailed description of the invention, as well as from the preferred embodiments referred to in the attached drawings, in which.

LIST OF REFERENCE NUMBERS IN THE FIGURES

| (1) | Wind turbine |
|---|---|
| (2) | Rotor |
| (3) | Blade |
| (4) | Substructure |

DETAILED DESCRIPTION OF THE INVENTION

A detailed description of the invention is provided in reference to different preferred embodiments thereof, according to the information provided by FIGS. 1A-8B herein. Said description is provided for illustrative and non-limiting purposes of the claimed invention.

Figure 1A:
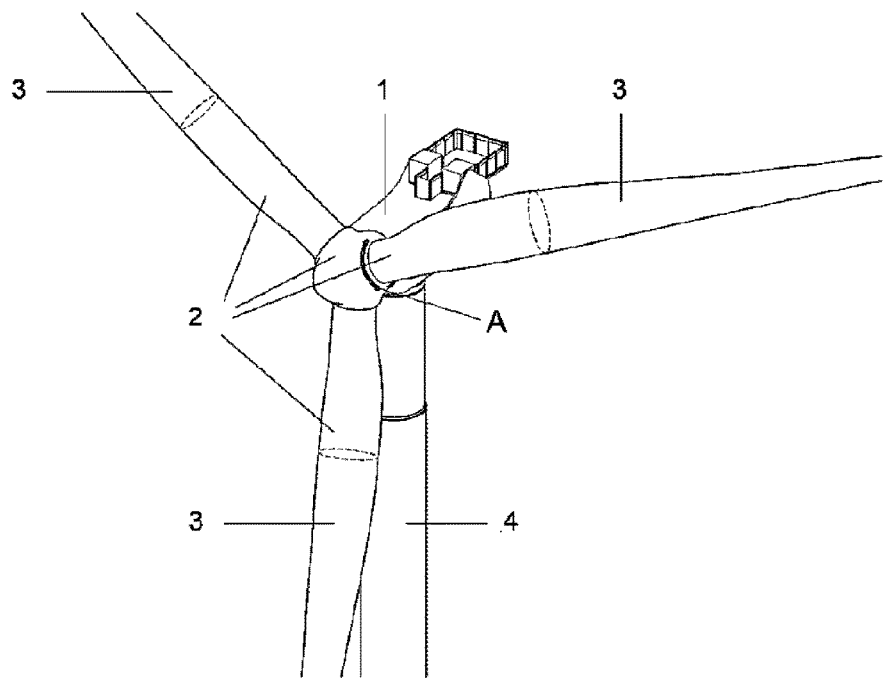
FIGS. 1A-1B show a representation of the pitch angle A of a wind turbine blade.
Figure 1B:
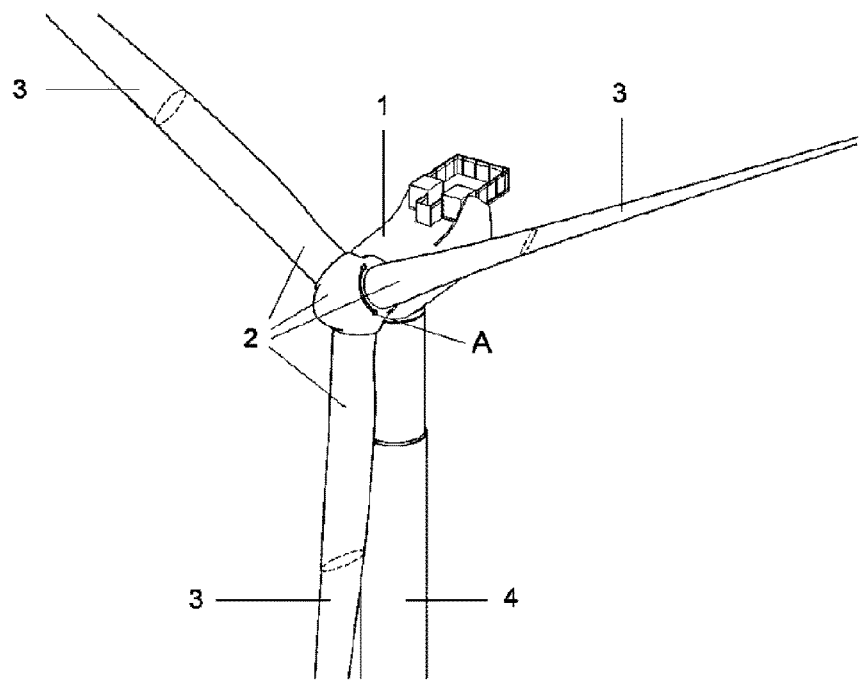

FIGS. 1A-1B schematically show the manner in which the pitch angle (A) of a blade (3) can be varied. FIG. 1A shows a minimum pitch angle (A=0) situation which maximizes exposure of the blades (3) to the wind, and therefore the production capacity of the wind turbine (1), whereas FIG. 1B shows a maximum pitch angle (A=about 90 degrees) situation, which situates the blades (3) in a feathered position and minimizes their exposure to the wind (also see the definition of pitch angle A of the blade (3) included in preceding sections).

To vary the pitch angle (A) of a blade, a wind turbine (1) comprises regulation means, usually consisting of a series of bearings and hydraulic actuators (not shown in FIGS. 1A-1B) controlled by means of the control system for controlling the wind turbine (1).

Figure 2A:
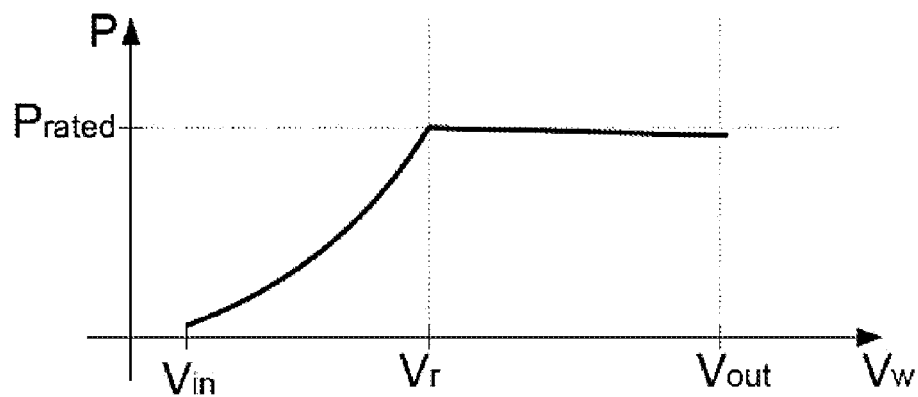
FIGS. 2A-2C show a variation of graphs for the following magnitudes depending on the wind speed $V_w$ with a conventional controller: a) power P vs. wind speed $V_w$; b) pitch angle A of the blade vs. wind speed $V_w$; c) thrust T vs. wind speed $V_w$.
Figure 2B:
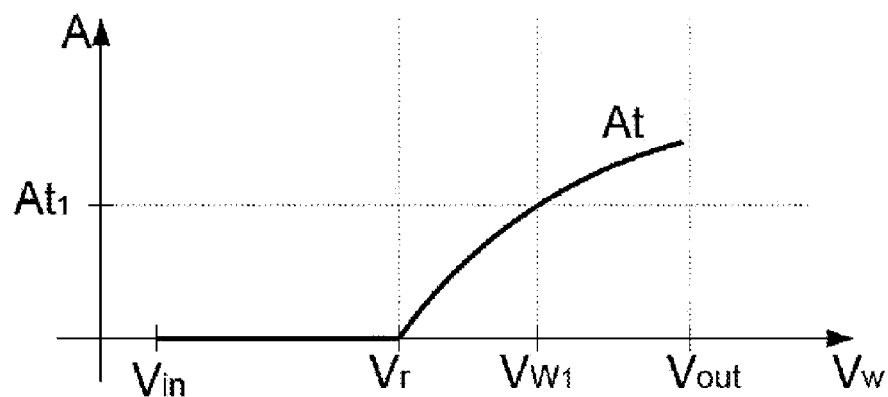
Figure 2C:
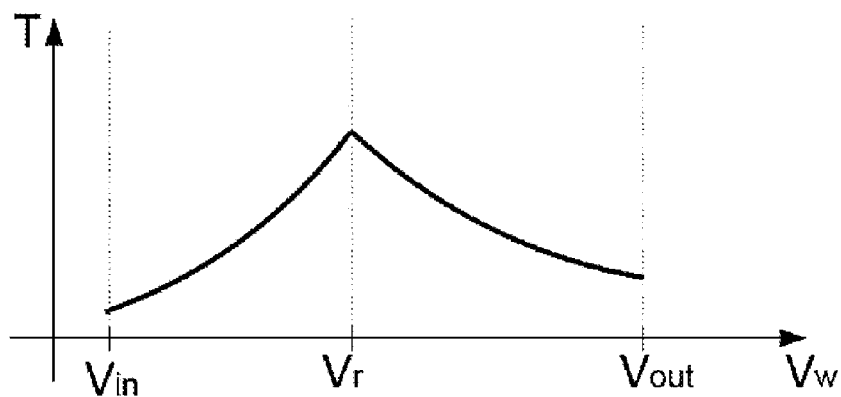
Figure 2C:
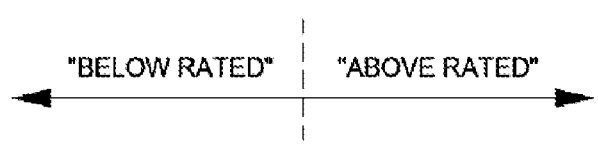
Figure 3A:
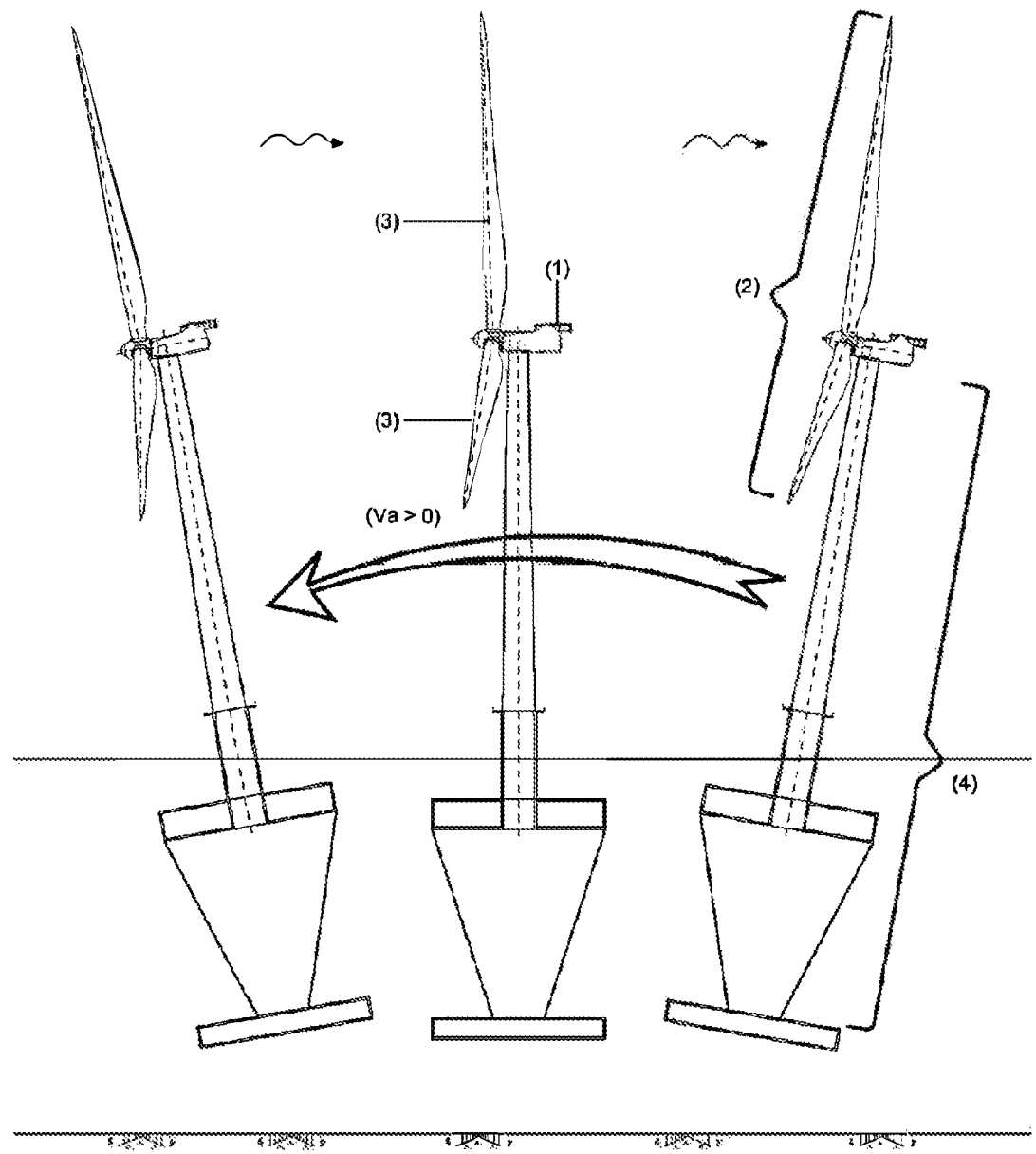
FIGS. 3A-3B show two representations of the speed of the wind turbine $V_a$ as a result of the movements of the floating structure supporting it.
Figure 3B:
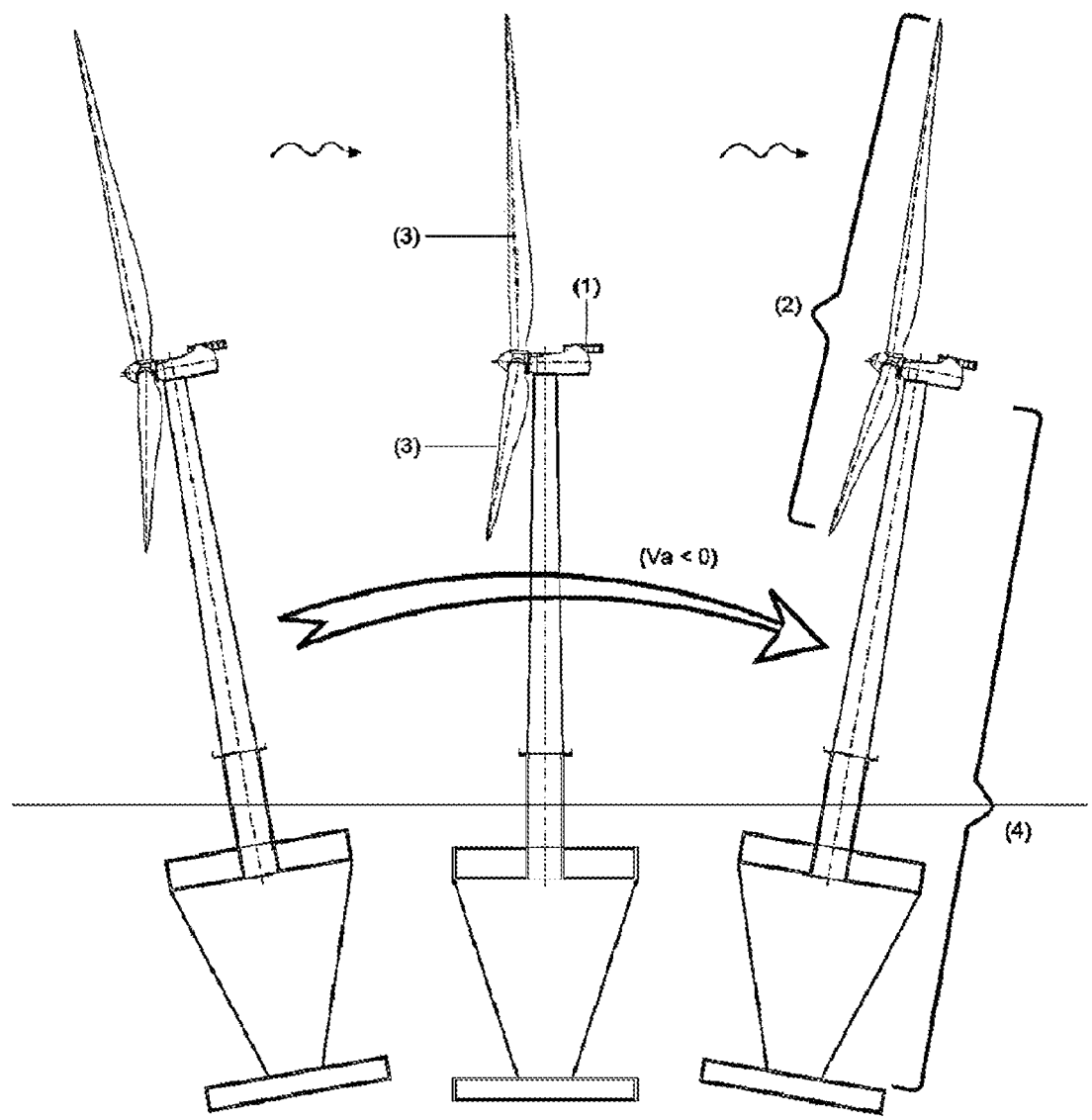

FIGS. 2A-2C shows a series of 3 curves describing the behavior of a conventional controller or control method, such as those that are normally used for wind turbines operating on fixed structures. FIGS. 3A-3B respectively show how the power (P), pitch angle (A) of the blades, and the horizontal thrust (T) that the wind exerts on the rotor (2) vary, depending on wind speed (Vw).

For low wind speeds, less than a reference value "Vr" referred to as "rated wind speed", the minimum pitch angle A of the blade (A=0) is maintained to maximize production (see FIG. 2B). In said situation, the generated power will be less than the rated power "$P_{rated}$" as wind speed "Vw" is less than "Vr" (see FIG. 2A).

When the wind speed reaches value Vr, the wind turbine (1) can start to produce at its rated power. When wind speed Vw exceeds Vr (Vw>Vr), the control system for controlling the wind turbine (1) increases the pitch angle A of the blades (3), as a result of which the production power P is caused not to exceed "$P_{rated}$" (see FIGS. 2A-2B).

Therefore, a certain theoretical value At of the pitch angle of the blade (At>0) corresponds to each wind speed Vw>Vr, such that the produced power P will be equal to the rated power $P_{rated}$. Said value may depend on a number of factors, including among them air density at each site. The graph showing the values of At is shown in graph 2b. For example, for a wind speed Vw1>Vr, the theoretical value At1 of the pitch angle of the blades (3) will lead to a production power P equal to the rated power of the wind turbine (1) ($P=P_{rated}$).

The horizontal thrust T that the wind exerts on the rotor (2) increases with wind speed while Vw<Vr (slope of the positive curve; see FIG. 2C). However, when Vw>Vr and the pitch starts to act, the situation is inverted and a higher wind speed Vw leads to lower thrust T (slope of the negative curve; see FIG. 2C). This latter situation leads to the negative damping phenomenon in situations with Vw>Vr, already described in the background section earlier.

Operation with Vw>Vr is referred to as above rated operation, whereas operation with Vw<Vr is referred to as below rated operation. The value of Vr may vary depending on the wind turbine model (1). Common values for Vr are about 12 m/s.

FIGS. 3A-3B schematically show the possible movements a wind turbine (1), in this case supported by a floating substructure (4), which generally enhances said movements, may experiment. FIG. 3A shows a movement substantially contrary to the direction of the wind (Va>0), whereas FIG. 3B shows a movement coinciding substantially with the direction of the wind (Va<0). Said movements and/or speeds will fundamentally be caused by changes in the inclination of the floating substructure (4), although they may also be caused, at least in part, by horizontal displacements of the substructure (4) or deformations experienced by the substructure (4), for example.

FIG. 3A shows by way of example a floating substructure (4) formed by two bodies, but the present invention applies to wind turbines supported by other types of substructures.

The control method according to the present invention provides a considerable advantage for wind turbines experimenting significant movements, and for that reason it is particularly suitable for floating wind turbines. However, it may also be advantageously used in wind turbines installed on other highly mobile and/or highly flexible substructures without departing from the scope of the invention. For example, the control system according to the present invention can also be used for wind turbines installed on very flexible towers the deformations of which generate significant movements in the wind turbine (1). What is usually known as soft towers, for example, are towers having a high natural oscillation period (higher than the rotation period of the rotor (2)) usually exceeding values of 3 s, which entails associated relevant deformations the negative effects of which may be prevented or mitigated by means of the present invention.

Movements experienced by the wind turbine (1) are generally cyclical, such that movement cycles with Va>0, herein referred to as forward movement cycles, are intercalated with movement cycles with Va<0, herein referred to as backward movement cycles. This is schematically shown in FIG. 4B, where it can be seen how the speed Va of the wind turbine (1) evolves over time and how the forward movement and backward movement cycles will generally be intercalated with one another.

Figure 4A:
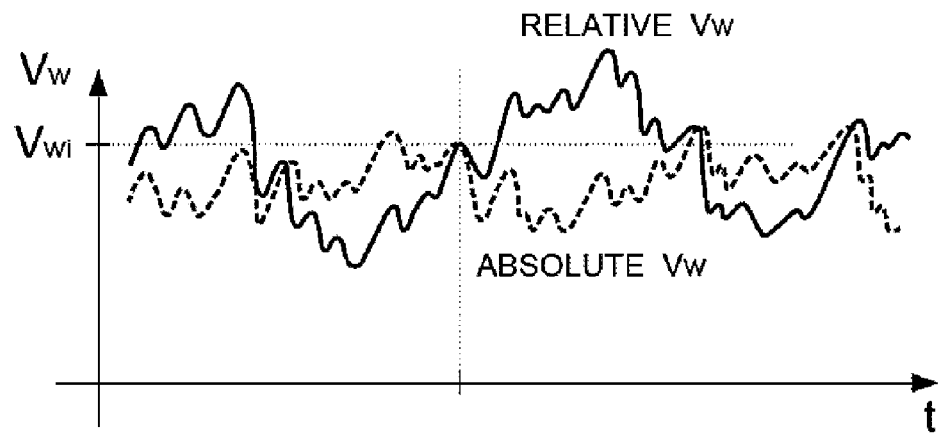
FIGS. 4A-4B show graphs corresponding to the forward movement cycle ($V_a>0$) and backward movement cycle ($V_a<0$), respectively, and how said cycles affect the apparent speed $V_w$ incident on the rotor, compared to a situation in which the wind turbine remains substantially fixed.

FIG. 4A shows how the wind speed Vw is affected with the movements of the wind turbine (1). The red curve in the graph of FIG. 4A shows how absolute wind speed, subject to natural turbulence or variability, evolves over time; said red curve represents what would be the wind speed Vw in the case of a perfectly fixed wind turbine (1). In turn, the green curve in the same graph represents the apparent or relative wind speed Vw with respect to the rotor (2), when the latter is not fixed but rather moves with speeds Va such as those shown in FIG. 4B. During a backward movement cycle (Va<0), the apparent or relative wind speed Vw decreases with respect to the absolute wind speed, whereas during a forward movement cycle (Va>0), the apparent or relative wind speed Vw increases with respect to the absolute wind speed shown in the red graph.

Figure 4B:
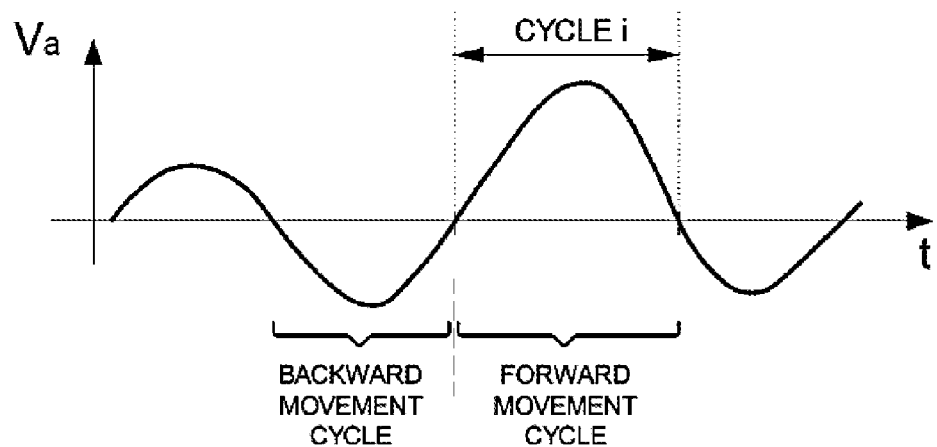

When looking at the graph in FIG. 4B, it can be considered that when the curve for the speed Va of the wind turbine (1) crosses the x-axis, a new forward movement or backward movement cycle is started. The wind speed Vwi measured in the instant in which a specific cycle i is started (see FIGS. 4A-4B) can be a parameter to be used in the algorithms which control the control method according to the present invention, as will be explained below.

FIGS. 5A-5D represent a series of graphs showing how different variables or parameters of the operation or control of a wind turbine (1) evolve over time. For a better explanation and understanding of the present invention, the representative behavior of a conventional controller with a fixed wind turbine (1) is depicted on one hand using red curves, and the representative behavior of a controller or control method according to the present invention for a floating wind turbine (1) that experiments movements is depicted on the other hand using green curves. The graphs correspond to a situation of above rated operation (Vw>Vr) and show the evolution of different magnitudes over time. The x-axes of all the graphs represent the same period of time on the same scale.

Figure 5A:
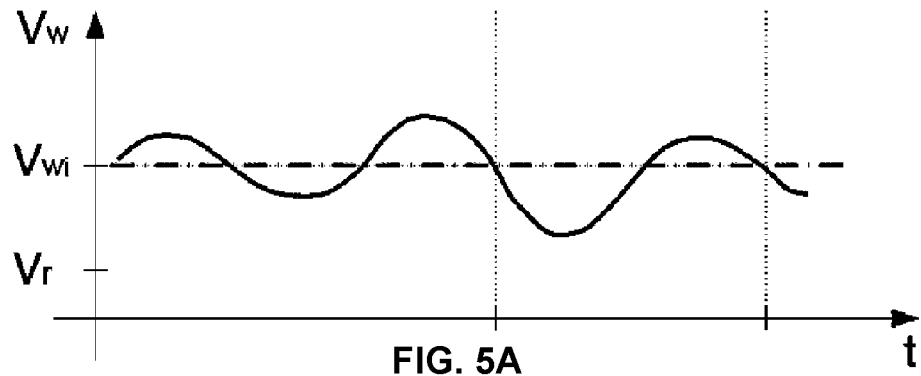
FIGS. 5A-5D represent a series of graphs showing how different variables or parameters for the operation or control of a wind turbine evolve over time, and how some of said parameters differ in the case of a fixed wind turbine or one with a conventional controller, and in the case of using the method of the invention.
Figure 5B:
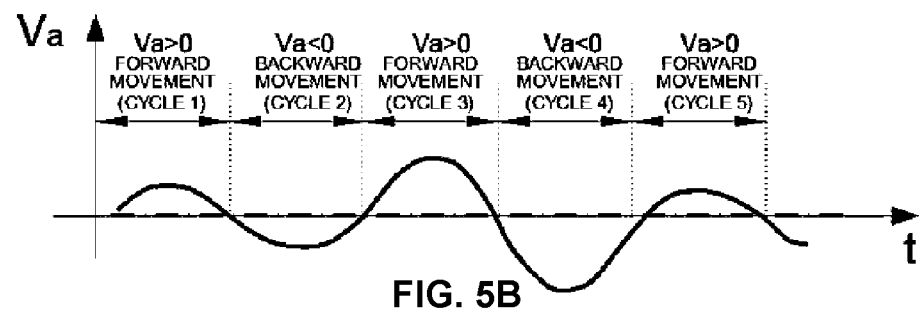

FIGS. 5A-5B are similar to FIGS. 4A-4B, but in the case of FIGS. 5A-5B, it has been assumed in a simplified manner that absolute wind speed is constant over time for the purpose of making the explanation and the graphic depiction thereof simpler. Therefore, the graph of FIG. 5A shows with a red horizontal curve the absolute wind speed, which is what would affect a perfectly fixed wind turbine (1) and in this case has a constant value and is equal to Vw1. In turn, the green discontinuous curve in the same graph shows the wind speed Vw that applies to a moving wind turbine (1), according to the curve of the speed of the wind turbine (1) shown in FIG. 5B. The corresponding intercalated forward movement and backward movement cycles can be observed.

Figure 5C:
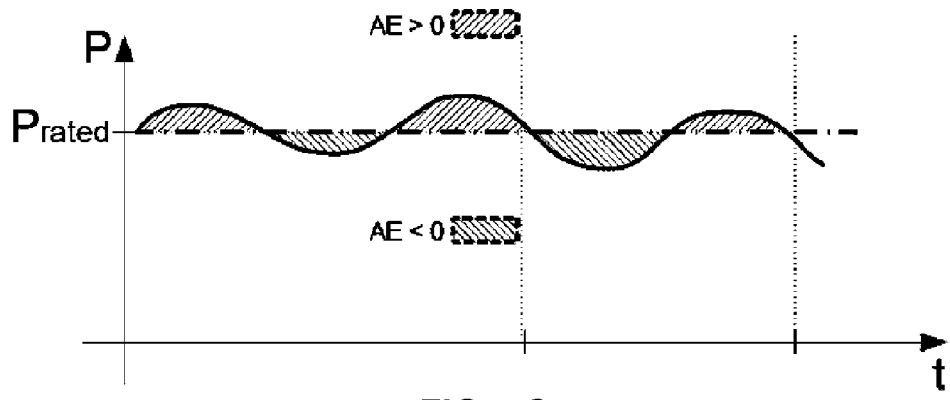
Figure 5D:
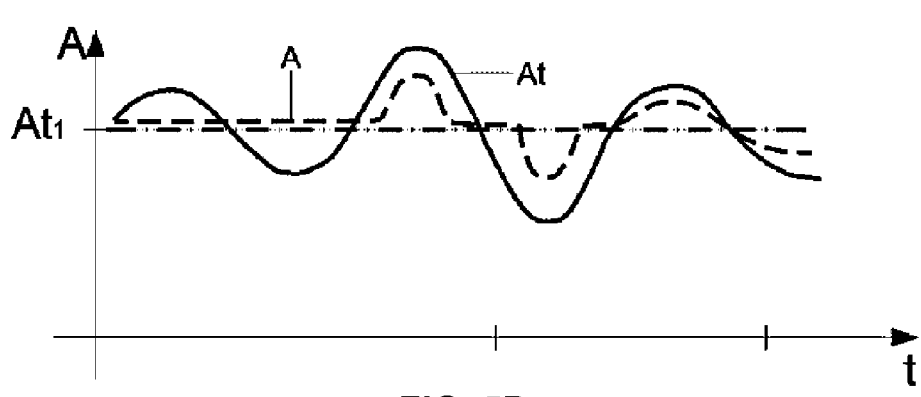

To eliminate or reduce the effect of negative damping and/or the movements experienced by the wind turbine (1), and/or to expand or improve the positive damping of said movements, and/or to increase energy production in the wind turbine (1), the control method according to the present invention carries out an operation (for the conditions of wind speed and wind turbine (1) shown in FIGS. 5A-5B) as depicted in FIGS. 5C-5D.

FIG. 5D shows the pitch angle of the blades A, over time. The horizontal red line represents the case of a fixed wind turbine (1) which, for a wind speed Vw1>Vr, would adopt a theoretical value At1 of the pitch angle of the blades, according to a curve like the one shown in FIG. 2B. The theoretical value At1 is what leads to a power P equal to the rated power $P_{rated}$ for said wind speed Vw1. Said power that is constant and equal to $P_{rated}$ which would be what is present in a fixed wind turbine (1) with a conventional controller is represented by the horizontal red line of FIG. 5C.

However, since movements in the wind turbine (1) occur, the speed Vw varies as shown with the green curve in FIG. 5A. A conventional controller would apply a theoretical pitch angle of the blades (3) against said variation in Vw that allowed keeping the produced power approximately constant and equal to $P_{rated}$. Said theoretical values At are obtained from a graph such as the one shown in FIG. 2B, and their variation over time, linked to the variation in Vw, is shown with the dotted black curve represented in FIG. 5D. Using said values At for the pitch of the blade (3) would allow keeping the power approximately constant and equal to the rated power, but it would lead to the undesirable negative damping effect described in sections above. To prevent or reduce said negative damping effect, the control method according to the present invention would adopt values for the pitch angle A of the blades (3) such as those represented by means of the discontinuous green curve in FIG. 5D. As can be seen in said curve, said values are such that A (discontinuous green curve) is less than At (dotted black curve) (A<At) during the forward movement cycles (Va>0). Otherwise, in the backward movement cycles A>At.

In turn, the power resulting from the wind turbine (1) is represented in the discontinuous green curve of FIG. 5C: during forward movement cycles (Va>0), the power P produced by the wind turbine (1) will be greater than $P_{rated}$, whereas during the backward movement cycles (Va<0), the power P produced will be less than $P_{rated}$.

It should be indicated that although the rated power $P_{rated}$ is generally a fixed and constant value over the service life of a wind turbine, in certain cases or wind turbine models it may be possible to adjust the value thereof for certain operating conditions or depending on certain parameters, e.g., the voltage of the generator, the reactive power to be produced as required by the network system, or the room temperature and/or the generator temperature. Therefore, in one embodiment of the invention, under specific conditions, it is possible to use a corrected value for parameter $P_{rated}$ that may differ from the rated power listed in the technical data sheet of a specific wind turbine model, without this affecting the operating steps and rules characterizing the method according to the present invention and therefore being kept within the scope thereof.

It must be understood that there are widely varying possibilities or strategies for the control algorithms of a method according to the invention. For example, algorithms which fix a target power value $P_{target}$ can be used, and the value of A that is established or results in each instant can be derived from said target power, or else specific values of A can be established, and the power values can be those resulting from the values of A that may be fixed. Several other possibilities that are evident or known in the art are likewise possible.

As observed in FIG. 5C, the controller or control method according to the present invention generates brief and intermittent over-production phases (P>$P_{rated}$) intercalated with as many other under-production periods (P<$P_{rated}$). Compared to the equivalent production situation of a fixed wind turbine (1) (represented by the red line in FIG. 5C), there is an alternating occurrence of periods in which more energy is comparatively generated (areas shaded in green in FIG. 5C corresponding to forward movement cycles) and periods in which less energy is comparatively generated (areas shaded in red in FIG. 5C corresponding to backward movement cycles). In the overall computation, under-production periods are offset by over-production periods to prevent or reduce possible energy losses. The control method according to the present invention can even lead to an increase in energy production as the over-production is greater than the under-production. This may be due to the fact that generated energy is proportional to the cube of wind speed Vw. This means that with the same variation in Vw for a forward movement cycle and a backward movement cycle, the gain in the former is greater than the loss in the latter. For example, if Vw increases by 10% during the forward movement cycle and likewise decreases by 10% during the backward movement cycle, then $1.1^3+0.9^3=1,331+0.729=2.06>2$, whereby more energy is generated than by working at a constant power. The control method according to the present invention thereby provides a manner in which a fraction of the energy associated with the movement of the structure can be extracted by the wind turbine (1).

The cyclic and alternating variation of power is a key factor in the control method according to the present invention. In fact, keeping power greater than $P_{rated}$ for permanent or prolonged periods may generally not be admissible due to limitations of the generator and/or of other components. In contrast, when over-production periods associated with forward movement cycles are brief and intercalated with under-production periods associated with backward movement cycles, the application and demand on the generator or other components of the electrical system decreases and is similar to what may occur in a situation of production at a power approximately constant and equal to the rated power $P_{rated}$.

Furthermore, the shorter duration of the forward movement and/or backward movement cycles, which will typically last for several seconds or tenths of a second, can limit the expected power increases and decreases, because the rotor (2) has a high rotational inertia, and a certain time is therefore required for greater torque of the wind on the rotor (2) to increase the rotation speed thereof, or for a lower torque of the wind to decrease the rotation speed thereof. Taking this into account, in a preferred embodiment of the present invention, the power P generated above rated, is at least in part adjusted by varying the rotation speed of the rotor (2). The increase in power associated with the forward movement cycles is thereby decreased and/or delayed, as it takes time to impart to the rotor (2) the increase in angular momentum associated with a higher rotation speed, and the decrease in power in the backward movement cycles is similarly decreased and/or delayed, as the decrease in torque generated by the wind takes time to translate into the corresponding decrease in rotation speed of the rotor (2) due to the high rotational inertia of the mass of the rotor (2).

Using the rotation speed of the rotor (2) as a parameter for adapting the power in the generator, by involving the rotational inertia of the rotor (2) and representing changes in the angular momentum thereof which require certain time, will lead to the amplitude of the power oscillations in the above rated operation (see FIG. 5C) being lower, thereby generating a potentially favorable effect. It is also for this to cause a certain difference between power oscillations and Va oscillations, which may temporarily involve in the initial part of a forward movement cycle P<$P_{rated}$ and/or in the initial part of a backward movement cycle P>$P_{rated}$, without departing from the scope of the present invention.

The power adjustment according to the present invention can also be done by varying the torque of the generator, or by means of a combination of varying the torque and the rotation speed of the rotor.

There are various specific strategies to establish the values of the pitch angle A of the blades (3) to be used without departing from the scope of the invention. By way of example, FIG. 5D shows various cases:
  In cycles 1 and 2, a strategy is applied in which the pitch angle A of the blades is kept constant despite variations in Vw.
  In cycles 3 and 4, the pitch angle A is kept constant until reaching a power threshold after which it starts to vary.
  In cycle 5, a gradual variation of A is applied throughout the cycle.

Whatever the specific strategy used to establish the exact value of A, the control method according to the present invention will always establish values A<At at least during part of the time for which Va>0 (forward movement cycles), generally coinciding with over-production periods (P>$P_{rated}$) and will always establish values A>At at least during part of the time for which Va<0 (backward movement cycles), generally coinciding with under-production periods (P<$P_{rated}$).

By preventing or lessening the increases in A during a forward movement cycle, the control method prevents or limits possible decreases in the thrusting force of the wind which resist movement during a forward movement cycle. Likewise, by preventing or lessening the decreases in A during a backward movement cycle, the control method prevents or limits possible increases in the thrusting force of the wind which amplify movement during a forward movement cycle. In that sense, the control method according to the present invention limits or eliminates the unfavorable negative damping effect, and it may even generate in its place positive damping during above rated operation, similarly to what generally occurs during below rated operation.

Figure 6A:
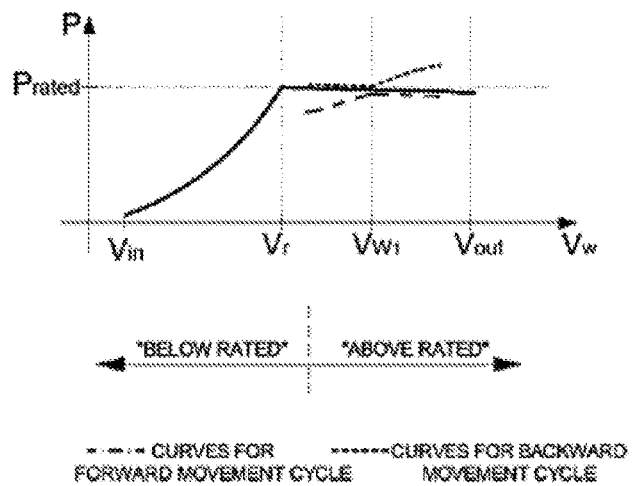
FIGS. 6A-6C show a variation of graphs for the following magnitudes depending on the wind speed $V_w$, in a first embodiment of the invention: a) power P vs. wind speed $V_w$; b) pitch angle A of the blade vs. wind speed $V_w$; c) thrust T vs. wind speed $V_w$.
Figure 6B:
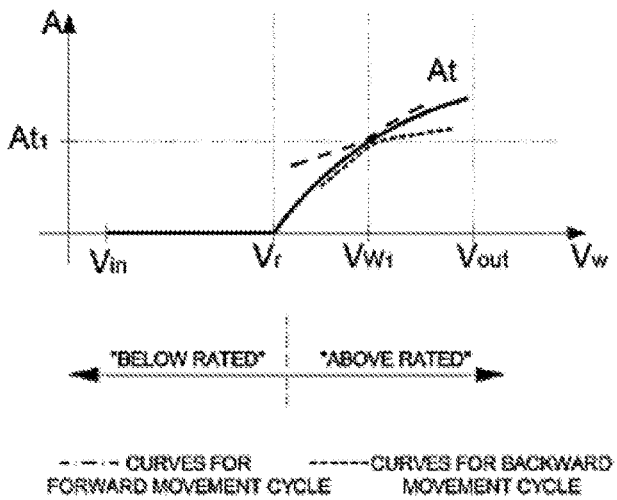
Figure 6C:
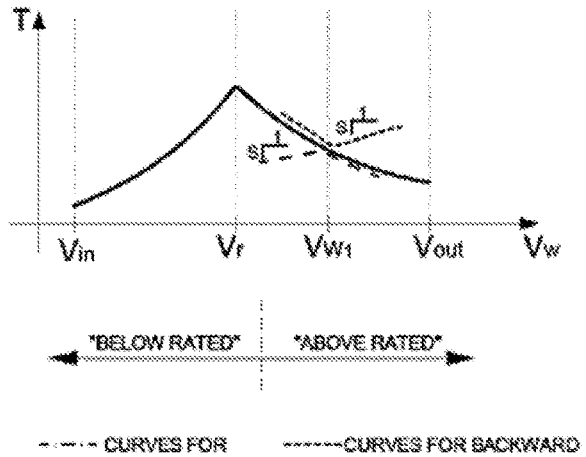

By way of non-limiting example, FIG. 6A-6C depicts a first embodiment of the control method according to the present invention. FIG. 6B specifically shows the values of the pitch angle of the blades (3) to be adopted during a specific cycle, whether it is the forward movement or the backward movement cycle, and in a situation of above rated operation. The graph of FIG. 5B shows the following curves:

Red curve, showing the values of A depending on Vw that a conventional controller would adopt. Said curve indicates the theoretical values At of the pitch angle of the blade (3) which, for each wind speed Vw>Vr, lead to a power P equal to the rated power $P_{rated}$.

Green curve, corresponding to the values of the pitch angle A of the blades that one embodiment of the control method according to the present invention would establish for a forward movement cycle (Va>0). It can be observed that the values of A indicated by said green curve are always equal to or less than At.

Blue curve, corresponding to the values of the pitch angle A of the blades that one embodiment of the control method according to the present invention would establish for a backward movement cycle (Va<0). It can be observed that the values of A indicated by said green curve are always equal to or greater than At.

The green and blue curves correspond to a specific forward movement or backward movement cycle, in which the wind speed Vw had a value Vwi at the start of the cycle (see FIGS. 4A-4B). The curves for cycles that were started at another speed would therefore be different but similar.

The method can establish target values of A, according to the rules of the method described above, such that the value of P is obtained as a result, or it can establish target values of P (by means of the variable $P_{target}$), such that the value of A is obtained as a result. Other similar or equivalent strategies may be possible for implementing the method of the invention generating a behavior such as the one depicted in FIGS. 5A-5D and/or FIG. 6A-6C.

Although the theoretical explanation of the control method according to the present invention relates to the wind speed Vw as a possible control parameter, in the practical application of the method it may generally be simpler and more efficient to use another parameter related directly to Vw but simpler to measure and monitor, such as the speed of the rotor (2) or the generator, as is typical in conventional controllers. Similarly, in the practical application of a preferred embodiment of the control method according to the present invention, the value of Va will not be measured directly, but rather will be obtained indirectly from measurements of other related parameters, particularly such as inclination and/or acceleration in the wind turbine (1). Generally, the control method according to the following invention can be used by using other control parameters which are directly related to the parameters used in the description of the method without departing from the scope of the invention. For example, instead of speed Va, the angular speed of the floating structure which is obtained from the rate of variation of the inclination, which is equivalent, can be used as a control parameter, or instead of wind speed, rotor speed, which is directly related, can be used for a torque value in the known generator.

As explained, the speed Va will be generated by the changes in the inclination of the floating support structure, which is generally the most influential parameter, as well as by other parameters such as, for example, horizontal displacements of the floating support structure or deformation of the floating support structure, which will generally be less influential parameters. In a preferred embodiment of the method according to the present invention, the speed Va is determined in an approximate manner only from variations in the inclination of the structure, without taking in consideration, for example, horizontal displacements of the structure. This allows the method according to the present invention to be particularly effective in damping and/or decreasing movements due to inclinations of the structure, which are generally the most relevant movements. Naturally, embodiments which determine Va from other parameters in addition to or instead of inclination of the structure are also possible, without departing from the scope of the invention.

FIG. 6A shows what the power produced by the wind turbine (1) will be in a forward movement cycle (green curve) or of backward movement cycle (blue curve) corresponding with the variation curves of the pitch angle A shown in FIG. 6B, both for above rated operating conditions. It can be seen that $P \geq P_{rated}$ in the forward movement cycle and $P \leq P_{rated}$ in the backward movement cycle.

Similarly, the graph shown in FIG. 6C shows what the variation in thrust T exerted by the wind on the rotor (2) will be, depending on the speed of the acting wind by applying the method in a forward movement cycle (green curve) or in a backward movement cycle (blue curve). As can be observed in the green curve, for a forward movement cycle thrust T is always increased compared to the value for the cycle starting speed Vwi. At the same time, as can be observed in the blue curve, for a backward movement cycle thrust T always decreases compared to the value for the cycle starting speed Vwi. Variations in T which resist movement (increasing T in forward movement cycles and decreasing T in backward movement cycles) are thereby achieved, a favorable positive damping thereby being achieved.

FIG. 6C represents the slope S of the curves defining T when Vw>Vwi (in forward movement cycles) and when Vw<Vwi (in backward movement cycles). Said slope will be a function of the curves defining A and/or defining P used in the method (such as those shown in FIGS. 6B and/or 6A). When said slope S is positive (as in the embodiment of the method shown in FIG. 6C), the method allows generating a suitable positive damping even for above rated operation in the same way as in the below rated operation in which the slope of the curve (red curve for Vw<Vr) is notably positive. If another embodiment of the present method generates a negative slope S, positive damping will not be generated, but since said negative slope is less pronounced than that of the red curve for the same value of Vw, the unfavorable negative damping effect will be reduced at least in part.

Figure 7A:
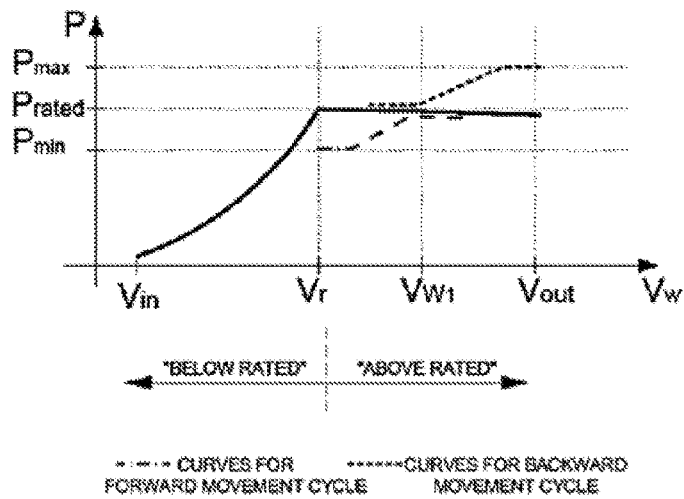
FIGS. 7A-7C show a variation of graphs for the following magnitudes depending on the wind speed $V_w$, in a second embodiment of the invention with variables $P_{max}$ and $P_{min}$: a) power P vs. wind speed $V_w$; b) pitch angle A of the blade vs. wind speed $V_w$; c) thrust T vs. wind speed $V_w$.
Figure 7B:
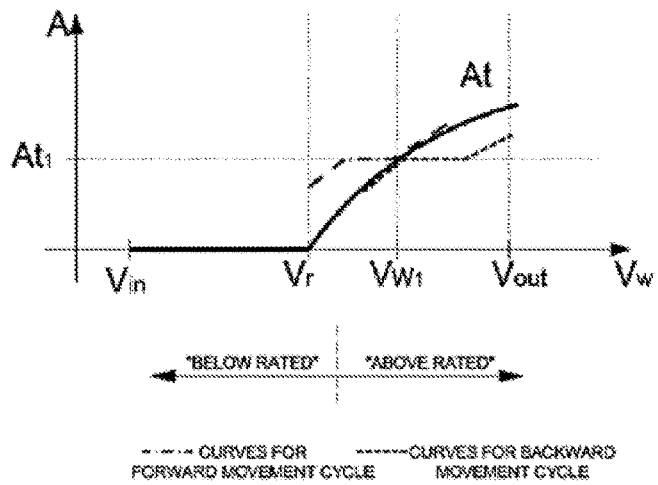
Figure 7C:
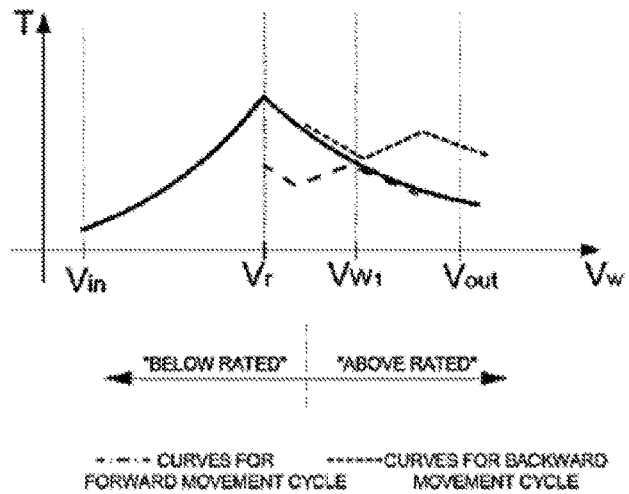

FIGS. 7A-7C show figures similar to those of FIG. 6A-6C for a second embodiment of the control method according to the present invention, again for above rated operating conditions (Vw>Vr). In this case, the control method incorporates variable $P_{max}$, which establishes the power threshold after which values of A which prevent exceeding said upper threshold are established, and variable $P_{min}$, which establishes the lower power value after which values of A which prevent a power less than said lower threshold are established.

The control method according to the present invention envisages said variables $P_{max}$ and $P_{min}$ having variable values which will be established dynamically and/or in time real taking into account various parameters or circumstances, such as:

- The type of forward movement or backward movement cycle the wind turbine (1) is in, or in other words, the sign of Va.
- The temperature of the generator.
- The voltage of the generator.
- The value of the wind speed Vwi at the start of the forward movement or backward movement cycle the wind turbine (1) is in.

As can be seen in FIG. 7A, in this embodiment of the method, $P \geq P_{rated}$ in a forward movement cycle (green curve), but to limit the excess power and/or production, an upper threshold $P_{max} > P_{rated}$ is established. Likewise, a lower threshold $P_{min} = P_{rated}$ is established in the forward movement cycle (said lower threshold $P_{min}$ is also established in the embodiment shown in FIGS. 6A-6C).

As can also be seen in FIG. 7A, in this embodiment of the method, $P \leq P_{rated}$ in a backward movement cycle (blue curve), but to limit the power and/or production loss, a lower threshold $P_{min} < P_{rated}$ is established. Likewise, an upper threshold $P_{max} = P_{rated}$ is established in the backward movement cycle (said upper threshold is also established in the embodiment shown in FIGS. 6A-6C).

Figure 8A:
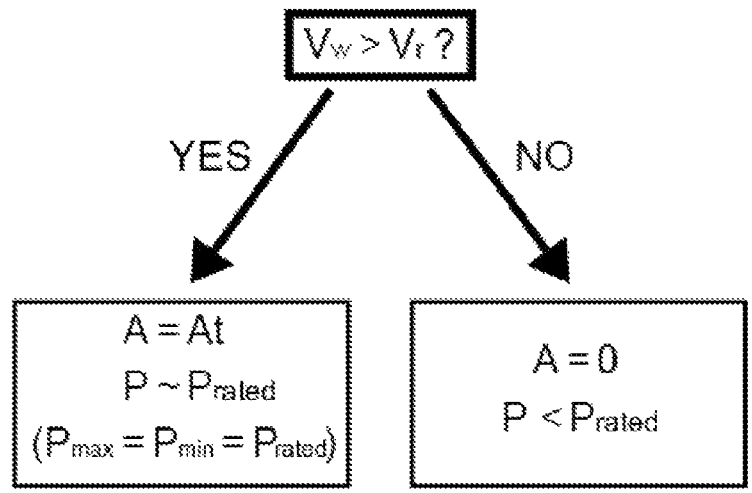
FIGS. 8A-8B show flow charts of the method of the invention, according to a preferred embodiment thereof.
Figure 8B:
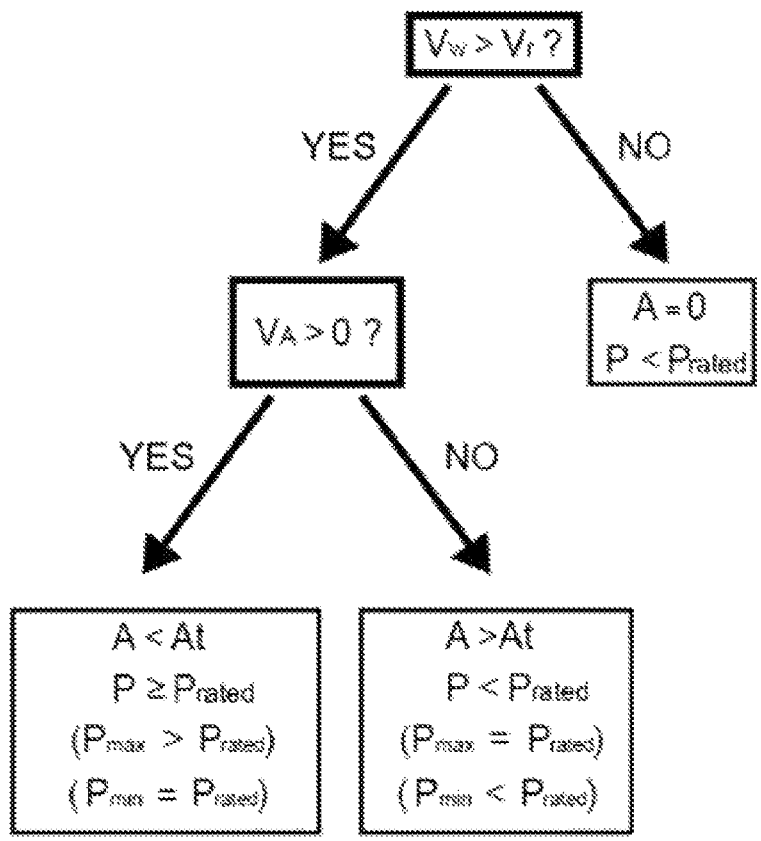

Lastly, FIGS. 8A-8B show flow charts corresponding to the control algorithms used in the embodiment of the method according to the present invention shown in FIG. 7A-7C. On one hand, FIG. 8A shows the flow chart used according to the current state of the art in a conventional controller; said flow chart would result in behavior curves such as those represented in FIGS. 2A-2C and in the red curves of FIGS. 7A-7C. According to said conventional controller, during the above rated operation (Vw>Vr), a power is kept approximately constant and equal to $P_{rated}$, regardless of the movements experimented by the wind turbine (1).

In such a conventional controller, the thresholds $P_{max}$ and $P_{min}$ described above are also present and/or implicit, adapting an equal and constant value ($P_{max} = P_{min} = P_{rated}$) regardless of the direction of movement of the wind turbine (1) (i.e., of the sign of Va).

Although a conventional controller according to the state of the art is generally designed to prevent the wind turbine (1) from operating at a power greater than the rated power, this does not necessarily mean that powers greater than the rated power will not arise at some point; however, the possible situations of working at a power greater than the rated power that may arise with controllers known in the art are completely different in form, cause and/or motivation with respect to situations of over-production caused intentionally by means of the control method according to the invention; for example, with a conventional controller a situation with $P > P_{rated}$ may arise due to the capacity of adjusting the pitch of the blades (3) not being instantaneous, and therefore in the event of a sudden rise in wind speed, there may be an increase in the power produced during the brief interval of time required by the control system to react and adjust the pitch of the blades (3), the purpose of which is to correct said situation. This situation is obviously completely different from what characterizes the control method referred to by the present invention, wherein the moments in which $P > P_{rated}$ are expected and caused by the control algorithm itself and are dependent on the movements experimented by the wind turbine, as described in FIG. 8B, for example.

FIG. 8B shows the flow chart for a control algorithm of a method according to the present invention. By means of said algorithm, for the above rated operation, the sign of the speed of the wind turbine (1) Va is taken into account to establish the pitch angle A and the variables $P_{max}$ and $P_{min}$ as indicated in a self-explanatory manner in the figure.

A control method according to the invention that considers the sign of Va has been described. It is of course possible to develop another embodiment of a method according to the invention which further takes into account the value of Va. For example, the value of Va can be used to establish a variable $P_{target}$ as described above. Or, for example, a method which maintains conventional algorithms can be used as long as the absolute value of Va does not exceed a certain value or threshold, and it only applies the most advanced method according to the present invention for high speeds of the wind turbine (1), above a certain threshold. Therefore, a conventional method can be maintained as long as speeds Va are small and insufficient to generate a significant negative damping effect.

The positive aerodynamic damping effect provided by the control method according to the present invention can be increased by establishing decreases of A for forward movement cycles (Va>0) and/or establishing increases of A for backward movement cycles (Va<0). One way to implement said improved damping in a control algorithm according to the present invention may consist of establishing $P_{min} > P_{rated}$ in forward movement cycles and/or $P_{max} < P_{rated}$ in backward movement cycles.

The invention claimed is:

1. A control method for controlling an offshore tower wind turbine, wherein said wind turbine comprises a rotor with a plurality of blades and a plurality of actuators, said control method comprising:
   a. producing a power P with the wind turbine, that is variable over time and dependent on a relative wind speed $V_w$ at which a wind strikes the rotor, where $P_{rated}$ is a rated power of the wind turbine that may be achieved when the relative wind speed $V_w$ is equal to or greater than a rated wind speed $V_r$;
   b. regulating a pitch angle A of the plurality of blades with the plurality of actuators, such that:
      i. given the relative wind speed $V_w$, an increase in the pitch angle A of the plurality of blades entails a decrease in a rotation speed of the rotor and/or of the produced power P and/or of a thrust that the wind exerts on the rotor;
      ii. given the relative wind speed $V_w$, a decrease in the pitch angle A of the plurality of blades entails an increase in the rotation speed of the rotor and/or of the produced power P and/or of the thrust that the wind exerts on the rotor;
      iii. the pitch angle A of the plurality of blades has a minimum value which is assigned, by convention, a 0-degree pitch value for the plurality of blades;
      iv. given the relative wind speed $V_w$ greater than $V_r$, there is a theoretical pitch angle of the plurality of blades $A_t$ greater than 0 degrees, such that the produced power P is substantially equal to $P_{rated}$;
   c. experiencing, in at least one working condition, movements that generate a speed of the wind turbine $V_a$, which is understood as being positive ($V_a > 0$) when the wind turbine is displaced in a direction substantially contrary to the direction of the wind and is understood as being negative ($V_a<0$) when the wind turbine is displaced in a direction coinciding substantially with the direction of the wind;

d. monitoring the speed of the wind turbine $V_a$ directly or indirectly with sensors;

establishing at least during part of the time for which the speed of the wind turbine $V_a$ is positive ($V_a>0$) and the relative wind speed $V_w$ is greater than $V_r$ ($V_w>V_r$), a pitch angle A of the plurality of blades less than $A_t$ ($A<A_t$), wherein the wind turbine produces a power P greater than $P_{rated}$ ($P>P_{rated}$); and/or establishing at least during part of the time for which the speed of the wind turbine $V_a$ is negative ($V_a<0$) and the relative wind speed $V_w$ is greater than $V_r$ ($V_w>V_r$), a pitch angle A of the plurality of blades greater than $A_t$ ($A>A_t$), wherein the wind turbine produces a power P less than $P_{rated}$ ($P<P_{rated}$).

2. The control method according to claim 1, wherein a variable $P_{max}$ is additionally used, where:
a. the value of $P_{max}$ is established dynamically and may therefore vary in each instant;
b. $P_{max}$ is defined as an upper threshold of power P such that, if the relative wind speed $V_w$ and/or the rotation speed of the rotor increase tending to generate a power greater than $P_{max}$, action is taken by increasing the pitch angle A of the plurality of blades so as to prevent and/or correct the power in the wind turbine being greater than $P_{max}$;
and wherein:
c. at least during part of the time for which the speed of the wind turbine $V_a$ is positive, variable $P_{max}$ is assigned a value greater than $P_{rated}$, and/or
d. at least during part of the time for which the speed of the wind turbine $V_a$ is negative, variable $P_{max}$ is assigned a value equal to $P_{rated}$.

3. The control method according to claim 1, further comprising a step of reducing the pitch angle A of the plurality of blades, wherein a variable $P_{min}$ is used, where:
a. the value of $P_{min}$ is established dynamically and may therefore vary in each instant;
b. $P_{min}$ is defined as a lower power threshold, wherein if $A>0$ and the relative wind speed $V_w$ and/or the rotation speed of the rotor decrease, tending to generate a power less than $P_{min}$, the pitch angle A of the plurality of blades is reduced so as to maintain and/or increase the power in the wind turbine;
and wherein:
c. at least during part of the time for which the speed of the wind turbine $V_a$ is positive, variable $P_{min}$ is assigned a value equal to $P_{rated}$; and/or
d. at least during part of the time for which the speed of the wind turbine Va is negative, variable $P_{min}$ is assigned a value less than $P_{rated}$.

4. The control method according to claim 1, wherein a variable $P_{target}$ is used, where:
the value of $P_{target}$ is established dynamically and may therefore vary in each instant;
$P_{target}$ is defined as the target power that the control method seeks to generate in a specific instant by the wind turbine;
wherein:
the value of the variable $P_{target}$ is established depending at least on the value of the speed of the wind turbine $V_a$ and wherein:

at least during part of the time for which the speed of the wind turbine $V_a$ is positive, variable $P_{target}$ is assigned a value greater than $P_{rated}$; and/or at least during part of the time for which the speed of the wind turbine $V_a$ is negative, variable $P_{target}$ is assigned a value less than $P_{rated}$.

5. The control method according to claim 1, characterized in that the value of the pitch angle A of the plurality of blades is established taking into consideration the value and/or sign of the speed $V_a$ of the wind turbine.

6. The control method according to claim 4, characterized in that the value of the pitch angle A of the plurality of blades is defined in two phases:
a. a first phase in which the value of the theoretical pitch angle $A_t$ is calculated;
b. a second phase in which a correction is applied on said theoretical pitch value of the plurality of blades to establish a real pitch value to be applied, establishing said correction according to at least one of the following rules:
i. if the speed of the wind turbine $V_a$ is positive, a correction is applied on the theoretical pitch value which prevents, reduces, or delays increases in pitch;
ii. if the speed of the wind turbine $V_a$ is negative, a correction is applied on the theoretical pitch value which prevents, reduces, or delays decreases in pitch.

7. The control method according to claim 1, characterized in that:
e. at least during part of the time for which the speed of the wind turbine $V_a$ is positive ($V_a>0$) and $V_w>V_r$, the control method prevents increases in the pitch angle A of the plurality of blades; and/or
f. at least during part of the time for which the speed of the wind turbine $V_a$ is negative ($V_a<0$) and $V_w>V_r$, the control method prevents decreases in the pitch angle A of the plurality of blades.

8. The control method according to claim 1, characterized in that the steps a-d of the control method are exerted only in the event of movements of the wind turbine having a specific amplitude and/or speed threshold value.

9. The control method according to claim 2, further comprising monitoring a temperature in the wind turbine by means of sensors, and in that the value which variable $P_{max}$ and/or $P_{target}$ are assigned in each instant depends on the temperature measured in the wind turbine.

10. The control method according to claim 2, characterized in that the control method comprises monitoring a voltage in the wind turbine by means of sensors, and in that the value which variable $P_{max}$ and/or $P_{target}$ are assigned in each instant depends on the voltage measured in the wind turbine.

11. The control method according to claim 10, characterized in that the control method is used in a wind turbine supported by a flexible and non-floating substructure, wherein the wind turbine comprises a first oscillation mode which has a period equal to or greater than 3 seconds.

12. A control system for controlling an offshore tower wind turbine, said wind turbine comprising a rotor with a plurality of blades and a plurality of actuators, the control system comprising:
one or more monitoring sensors for monitoring a plurality of physical parameters of said wind turbine; and
a controller adapted to adjust a power P with the wind turbine and a pitch angle A of the plurality of blades, wherein the wind turbine, the monitoring sensors and the controller are configured to carry out the following steps:
a. producing the power P with the wind turbine, wherein P is variable over time and dependent on a relative wind speed $V_w$ at which a wind strikes the rotor, where $P_{rated}$ is a rated power of the wind turbine that may be achieved when the relative wind speed $V_w$ is equal to or greater than a rated wind speed $V_r$;
b. regulating the pitch angle A of the plurality of blades with the plurality of actuators and the controller, such that:
  i. given the relative wind speed $V_w$, an increase in the pitch angle A of the plurality of blades entails a decrease in a rotation speed of the rotor and/or of the produced power P and/or of a thrust that the wind exerts on the rotor;
  ii. given the relative wind speed $V_w$, a decrease in the pitch angle A of the plurality of blades entails an increase in the rotation speed of the rotor and/or of the produced power P and/or of the thrust that the wind exerts on the rotor;
  iii. the pitch angle A of the plurality of blades has a minimum value which is assigned, by convention, a 0-degree pitch value for the plurality of blades;
  iv. given the relative wind speed $V_w$ greater than $V_r$, there is a theoretical pitch angle of the plurality of blades $A_t$ greater than 0 degrees, such that the produced power P is substantially equal to $P_{rated}$;
c. experiencing, in at least one working condition, that generate a speed of the wind turbine $V_a$, which is understood as being positive ($V_a>0$) when the wind turbine is displaced in a direction substantially contrary to the direction of the wind and is understood as being negative ($V_a<0$) when the wind turbine is displaced in a direction coinciding substantially with the direction of the wind;
d. monitoring the speed of the wind turbine $V_a$ directly or indirectly with the monitoring sensors;
  establishing at least during part of the time for which the speed of the wind turbine $V_a$ is positive ($V_a>0$) and the relative wind speed $V_w$ is greater than $V_r$ ($V_w>V_r$), a pitch angle A of the plurality of blades less than $A_t$ ($A<A_t$), wherein the wind turbine produces a power P greater than $P_{rated}$ ($P>P_{rated}$); and/or
  establishing at least during part of the time for which the speed of the wind turbine $V_a$ is negative ($V_a<0$) and the relative wind speed $V_w$ is greater than $V_r$ ($V_w>V_r$), a pitch angle A of the plurality of blades greater than $A_t$ ($A>A_t$), wherein the wind turbine produces a power P less than $P_{rated}$ ($P<P_{rated}$).

13. A wind turbine comprising the control system of claim 12.

14. The wind turbine according to claim 13, further comprising an electrical system capable of temporarily producing a power P greater than its rated power $P_{rated}$, in intermittent periods having a duration of less than 100 seconds and intercalated with periods in which a power P less than $P_{rated}$ is produced.

* * * * *